United States Patent [19]

Ingenito et al.

[11] Patent Number: 5,986,001
[45] Date of Patent: *Nov. 16, 1999

[54] OCULAR LENS COMPOSITION AND METHOD OF FORMATION

[75] Inventors: Donald R. Ingenito, Moraga; Henry F. Rugge, Oakland; David S. Soane, Piedmont, all of Calif.; William L. Sturm, Calgary, Canada

[73] Assignee: Rasor Associates, Inc., Sunnyvale, Calif.

[*] Notice: This patent is subject to a terminal disclaimer.

[21] Appl. No.: 08/988,792

[22] Filed: Dec. 11, 1997

Related U.S. Application Data

[63] Continuation of application No. 08/255,570, Jun. 13, 1994, Pat. No. 5,723,541, which is a continuation-in-part of application No. 08/077,857, Jun. 16, 1993, abandoned.

[51] Int. Cl.$^6$ .................................................... C08L 53/00
[52] U.S. Cl. ............................................ 525/92; 525/464
[58] Field of Search ....................................... 525/92, 464

[56] References Cited

U.S. PATENT DOCUMENTS

| | | | |
|---|---|---|---|
| Re. 31,406 | 10/1983 | Gaylord | 526/279 |
| 3,189,662 | 6/1965 | Vaughn, Jr. | 260/824 |
| 3,419,634 | 12/1968 | Vaughn, Jr. | 260/824 |
| 3,419,635 | 12/1968 | Vaughn, Jr. | 260/824 |
| 3,808,179 | 4/1974 | Gaylord | 260/86.1 |
| 3,850,892 | 11/1974 | Shen et al. | 260/80.72 |
| 3,994,988 | 11/1976 | Laurin | 260/824 |
| 4,120,570 | 10/1978 | Gaylord | 351/40 |
| 4,478,981 | 10/1984 | Arkles | 525/92 |
| 4,536,554 | 8/1985 | Lim et al. | 526/264 |
| 4,550,139 | 10/1985 | Arkles | 525/90 |
| 4,824,922 | 4/1989 | Chapman | 526/279 |
| 5,158,717 | 10/1992 | Lai | 264/1.1 |
| 5,258,490 | 11/1993 | Chang | 528/488 |

FOREIGN PATENT DOCUMENTS

| | | |
|---|---|---|
| 0 154 270 | 9/1985 | European Pat. Off. . |
| 0 315 836 | 5/1989 | European Pat. Off. . |
| 0 345 994 | 12/1989 | European Pat. Off. . |
| 0 362 145 | 4/1990 | European Pat. Off. . |
| 0 386 249 | 9/1990 | European Pat. Off. . |
| 2 185 653 | 1/1974 | France . |
| 2 270 289 | 12/1975 | France . |
| 23 24 654 | 11/1973 | Germany . |

OTHER PUBLICATIONS

Arkles, "Look, what you can make out of silicones", *ChemTech*, 13, 542–555 (1983).

Noshay et al., *Block Co–Polymers,Overview and Critical Survey*, Academic Press, New York (1977), pp. 393 ff.

Sperling, *Interpenetrating Polymer Networks and Related Materials*, Plenum Press, New York (1981), Chapter 3.

Vaughn, "The synthesis and properties of alternating block polymers of dimethylsiloxane . . .", *Polymer Lett.*, 7, 569–572 (1969).

LeGrand, "Mechanical and optical studies of poly(dimethylsiloxane) bisphenol–A polycarbonate copolymers", *Polymer Lett.*, 7, 579–585 (1969).

Barrie et al., "Gas transport in heterogeneous polymer blends", *J. Membrane Sci.*, 21, 185–202 (1984).

*Modern Plastics Encyclopedia*, McGraw–Hill, (1984–5), p. 452.

Contact Lenses, 2nd ed., Stowe and Phillips, eds., Butterworths, Boston (1981), v.2, ch.13, pp. 377–398.

Kambour, "Structure and properties of alternating block polymers . . .", *Block Polymers*, Aggarwal, ed., Plenum Press, New York (1970).

Ward, III, et al., "Ultrathin silicone/polycarbonate membranes for gas separation processes", *J. Membrane Sci.*, 1, 99–108 (1976).

Walker, *Handbook of Thermoplastic Elastomers*, Van Nostrand Reinhold, New York, pp. 263–283.

Fitzgerald, "Understanding permeability and wettability", *The Contact Lens Journal*, pp. 2–9.

Kambour, "Microdomains in alternating block polymers of dimethylsiloxane and bisphenol–A carbonate", *Polymer Lett.*, 7, 573–577 (1969).

Tighe, "Polymers as contact lens materials: an overview", *Chemistry and Industry*, No. 22, (Nov. 21, 1981).

Tighe, "The design of polymers for contact lens applications", *British Polymer Journal*, pp. 72–77 (Sep. 1976).

*Primary Examiner*—Helen L. Pezzuto
*Attorney, Agent, or Firm*—Heller Ehrman White & McAuliffe

[57] ABSTRACT

A gas permeable (GP) ocular lens composition and method of formation are disclosed wherein 98–70% by wgt. of a first polymer component, selected for desired characteristics including gas permeability, and 2–30% by wgt. of a second polymer component, selected for basic GP lens characteristics such as rigidity, structural stability and desired refractive index, are combined in an interpenetrating polymer network (IPN) structure forming a thermoplastic composition having optical clarity/compatibility and facilitating low cost formation by molding or thermoforming. The first polymer component is a block co-polymer from first and second monomers. The resulting lens composition has a flexure modulus in the range of about 2,000–50,000 psi; preferably about 5,000–40,000 psi; and more preferably about 20,000–40,000 psi. In one embodiment, the lens comprises a central portion and an annular portion of different characteristics. In another cosmetic embodiment, a film with an image of an iris is encapsulated in the composition.

19 Claims, 4 Drawing Sheets

OCULAR LENS COMPOSITION AND METHOD OF FORMATION

CROSS-REFERENCE TO RELATED APPLICATIONS

This application is a continuation of application Ser. No. 08/255,570, filed Jun. 13, 1994, now U.S. Pat. No. 5,723,541 which is in turn a continuation-in-part of application Ser. No. 08/077,857, filed Jun. 16, 1993 and now abandoned. This application is also related to application Ser. No. 08/706,280, filed Sep. 4, 1996, now U.S. Pat. No. 5,789,483 which is a division of application Ser. No. 08/255,570.

FIELD OF THE INVENTION

The present invention relates to ocular lenses and their manufacture and, more particularly, to the composition and manufacture of such products commonly characterized as gas permeable (GP) ocular lenses.

BACKGROUND OF THE INVENTION

Lenses of the type contemplated by the present invention are generally characterized as ocular lenses and encompass lenses intended for direct contact with the eye (including both corneal and scleral type lenses). In addition, the term "contact lens" as employed herein is intended to include not only conventional contact lenses which are generally arranged on the surface of the eye but also intraocular or insert-type lenses commonly employed as surgical implants.

The term "contact lens" includes both scleral type lenses as well as more conventional lenses commonly referred to as contact lenses. In this regard, scleral type lenses generally have an outer annular portion of the lens adapted for contact with the eye. A pocket or recess is formed between the eye and a central portion of the lens and can be filled either with ophthalmological solution or tear solution fluid. The more conventional contact type lens referred to above, by contrast, is in generally uniform contact with the eye except for a thin film of tear fluid or the like. It is also to be understood that the term "contact lens" includes other varieties of lenses such as soft lenses, hard lenses, etc.

Hard ocular lenses, such as contact lenses, were initially made exclusively from glass. As interest and experience increased in polymer technology, glass was replaced by poly(methyl methacrylate) which then became the standard composition for such lenses because of its toughness, optical properties and physiological inactivity, as well as relative ease of manufacture (as least compared to prior art at the time), for example by turning on a suitable lathe.

Although hard contact lenses formed either from glass or poly(methyl methacrylate) could be fabricated in a full range of optical corrections, both materials were essentially impermeable to oxygen and therefore, as further explained below, could not be worn by a user for extended periods. Rather, the initial hard contact lenses were limited generally to daily usage. Although the hard contact lenses were also readily capable of sterilization, for example during overnight non-use, interest rapidly developed in contact lenses which could be worn for extended periods of time and which were inherently more comfortable.

This interest led to the development of so-called "soft contact lenses" which emerged with the development of a class of polymers generally referred to as "hydrogels". The key to the development of soft contact lenses was their relatively high water content yielding a soft flexible material with oxygen transport taking place through the body of the lens largely by means of the water component rather than the lens polymer itself. For this reason, so-called soft contact lenses were capable of extended wear, were immediately more comfortable and became highly popular.

However, soft contact lenses have tended to exhibit certain undesirable characteristics even though they usually present adequate oxygen permeability to avoid damage to the cornea over extended periods of wear. Such disadvantages include the inability to fabricate soft contact lenses to correct for all types of visual defects or to provide the full range of optical correction required for all users. Additionally, dehydration causes visual acuity to decrease during the days wearing period. Furthermore, soft contact lenses are generally characterized as being fragile and having a relatively short use life. Finally, soft contact lenses have been associated with infection of the eye from microorganisms and, therefore require a stringent sterilization and maintenance regimen.

The term "extended" use or wear may have various meanings in connection with contact lenses. Generally, although that term may refer to use or wear over a long term of, for example, thirty days, the term is used herein to signify use or wear at least overnight.

Even more recently, interest has developed in "rigid gas permeable" contact lenses or RGP contact lenses which combine the desirable features of hard contact lenses as noted above and the permeability and extended wear possibilities of soft contact lenses. Permeability is considered a fundamental requirement, particularly for RGP contact lenses, in order to permit the transport of atmospheric oxygen through the lens to the cornea. This is necessary because, unlike most tissues in the body, the human cornea lacks blood vessels for supplying oxygen to the cornea in the form of oxygenated blood. Rather, the cornea normally obtains oxygen directly from surrounding air. Contact lenses naturally interfere with this oxygen source, producing the need for gas permeability as noted above to avoid damage to the cornea, particularly during extended wear.

RGP contact lenses may be considered to have three essential requirements because of their function as an extension of the cornea. Initially, it is necessary as noted above to maintain a continuous undisturbed supply of oxygen to the cornea. As noted above, this is typically achieved by maintaining gas permeability in the contact lens itself. Secondly, it is necessary for the lens to be structurally stable at least to the extent of resisting deforming forces of the eyelid during blinking, for example in order to avoid visual instability. Thirdly, the composition of the lens must be such to provide surface wettability sufficient to enable a continuous tear film to be maintained between the lens and the cornea. At the same time, desirable surface characteristics include compatibility with the eye and the ability to avoid or minimize accumulation of proteinaceous material on the surface of the lens. Still other characteristics are also important, including comfort, coloration, and clarity. Finally, the material of an RGP ocular lens should be inexpensive to process into a completed lens. This characteristic is particularly important for low-cost lenses such as disposable lenses, which are becoming of greater interest.

The RGP contact lenses developed to date have been found satisfactory for certain of the above requirements with the possible exception of cost, comfort and, in some cases, wettability and structural stability. With available polymer technology, RGP lenses can incorporate relatively high oxygen permeability. At the same time, the RGP lenses can be fabricated in a broad range of optical corrections with the ability to correct most visual defects.

However, fabrication techniques for RGP contact lenses to date are relatively expensive, requiring techniques such as substantial machining on special lathes. It has further been found that contact lenses produced by these techniques tend to exhibit "creep", leading to changes in curvature of the lenses and compromising their structural stability. Additionally, some RGPs present comfort problems because of the lack of adequate wettability of some polymers and the inherent highly-rigid or non-flexible nature of the lens.

Generally, a broad range of polymers and combination of polymers and techniques have been considered to date in the development of desirable contact lenses. For example, a series of patents, as noted below, have disclosed a variety of linear co-polymers including acrylates for achieving desirable characteristics in RGP contact lenses.

Initially, Gaylord U.S. Pat. No. 3,808,179 issued Apr. 30, 1974 under assignment to Polycon Laboratories, Inc. disclosed contact lenses fabricated from a co-polymer of a fluoroalkyl acrylic ester and an alkyl acrylate or methacrylate to exhibit increased oxygen permeability. A wide variety of fluoroalkyl acrylic esters was disclosed in that patent.

Gaylord U.S. Pat. No. 4,120,570 issued Oct. 17, 1978 under assignment to Syntex (U.S.A.), Inc. disclosed yet another class of contact lens materials including in large part a polysiloxanylalkyl ester of a specified structure and allegedly having various improved functions such as improved oxygen permeability and surface wettability.

Gaylord Reissue Pat. No. 31,406 reissued Oct. 4, 1983 under assignment to Syntex (U.S.A.), Inc. further disclosed contact lenses fabricated from a co-polymer of a polysiloxanylalkyl acrylic ester (see the above patent) and an alkyl acrylic ester for the specified purpose of increased oxygen permeability. Another class of materials considered in contact lenses are silicone elastomers, the simplest of which may be characterized as poly(dimethylsiloxanes). A wide variety of such materials and reference to their possible use in contact lenses is noted in an article by Barry Arkles, "Look What You Can Make Out of Silicones", a reprint from CHEMTECH, 1983, 13, pp. 542–555 and Arkles U.S. Pat. Nos. 4,478,981 issued Oct. 5 23, 1984 and 4,550,139 issued Oct. 28, 1985.

Similarly, Laurin U.S. Pat. No. 3,994,988 issued Nov. 30, 1976 under assignment to Baxter Travenol Laboratories, Inc. disclosed co-polymers of polysiloxane, polycarbonate and polyester constituents particularly contemplated for a wide variety of medical applications including contact lenses.

Of related interest, a survey of various co-polymer systems was set forth in a book by Noshay and McGrath, *Block Co-Polymers, Overview and Critical Survey*, Academic Press, New York (1977), pp. 393, 394, et al. This reference is particularly noted in connection with the present invention in that it defines block co-polymers and sets forth numerous combinations of polymers which may be combined in block co-polymers useful for ocular lens compositions.

Additional block co-polymers particularly contemplated for use in contact or ocular lenses as defined by the present invention were disclosed in German Patent Application 2324654 filed May 19, 1973 under assignment to Biocontacts, Inc. from Stark, Auslander, Mandell and Marg. A corresponding disclosure appeared in French Application 2.185.653, Registration No. 73.181.11, also assigned to Biocontacts, Inc. from the same inventors. Both of these patents relied for priority on U.S. Pat. No. application Ser. No. 255,220, filed May 19, 1972 and subsequently abandoned. The above noted patents disclosed various block co-polymers of silicone and polycarbonate for forming contact lenses. Generally, the materials disclosed in these patents were not sufficiently stiff to permit machining.

Particularly in connection with the references noted immediately above, it is important to distinguish between block co-polymers and other co-polymers which are commonly referred to as linear or random co-polymers. Generally, as their name implies, block co-polymers are characterized by blocks or continuous chains of specific chemical species tending to demonstrate unique properties of the respective polymeric species.

By contrast, random co-polymers tend to be relatively short chain units, often with single monomer units in varying distribution along the chain link. In any event, the random co-polymers do not include clearly defined blocks of selected polymers as in block co-polymers.

Distinctions between block co-polymers and other co-polymers of the type referred to above are also set forth within a reference by Sperling noted and discussed in greater detail below.

Lim, et al, U.S. Pat. No. 4,536,554 issued Aug. 20, 1985 under assignment to Barnes-Hind, Inc. disclosed various compositions of hydrophilic polymers and contact lenses formed from those polymers, the Lim, et al. patent further disclosing transparent, optically clear interpenetrating network polymers for forming products such as contact lenses from such polymer systems. The interpenetrating polymer network (IPN) was specifically employed for combining two polymers in network form with one of the polymers being bound by the other polymer and allowed to swell to take on a substantial water content as high as 65% by weight. In any event, the IPN system of the Lin, et al. patent was specifically directed toward standard water-based soft hydrogel contact lenses.

The preceding references are believed to be fairly representative of the prior art. Furthermore, it is emphasized that although certain polymer systems have been developed lending themselves to specific applications in contact lenses, there remains a great need for a further improved contact lens, particularly a contact lens having a combination of many of the desirable properties; i.e., comfort, structural stability, high gas permeability, wettability, and clarity, while also having the ability to be manufactured in a simple, inexpensive manner, for example by molding, in order to particularly make the lenses available for relatively low-cost applications, such as for disposable use.

SUMMARY OF THE INVENTION

It is therefore an object of the invention to provide an improved gas permeable (GP) contact lens composition and method of forming the contact lens to achieve the above-stated desirable qualities.

It is a further object of the invention to provide GP ocular lens compositions and a method of formation wherein the compositions include a first polymer component and a second polymer component, the first and second polymer components being combined in an interpenetrating polymer network (IPN) to form the GP ocular lens composition, the first polymer component being selected to provide gas permeability and preferably other desirable properties as well, the second polymer component providing characteristics including flexibility or rigidity as desired, structural stability and desired refractive index, the first and second polymer components also being selected in combination for forming a thermoplastic composition having optical clarity and compatibility and facilitating low cost formation of the GP ocular lens by techniques commonly referred to as molding or thermoforming.

It is another object of the invention to provide an improved gas permeable contact lens composition and method of forming such a contact lens having a novel combination of features including flexibility, moldability and gas permeability particularly suitable for extended wear.

It is even more preferably contemplated that contact lenses according to the present invention have a particularly desirable combination of gas permeability and lens rigidity as discussed in greater detail below.

The second polymer component is preferably selected from a class of polymers which exhibit the basic lens characteristics referred to above and selected from the class consisting of acrylates (including methacrylates, diacrylates and dimethacrylates), pyrolidones, styrenes, amides, acrylamides, carbonates, vinyls, acrylonitriles, nitrites, sulfones, siloxanes, glycols, ethers and combinations of the above.

Furthermore, the second polymer component is preferably an interpenetrating network component forming an interpenetrating network with respect to the first polymer component in the ocular lens composition.

It is also an object of the invention to provide such a gas permeable contact lens composition and method of forming the lens wherein the interpenetrating network is formed by solution polymerization. More preferably, the interpenetrating network of the lens composition is formed by solution polymerization with a relatively high concentration of a free radical initiator of greater than 0.9 molar percent of monomer, preferably at least about 1.0 molar percent of monomer and more preferably at least about 1.2 molar percent of monomer.

It is a still further object of the invention to provide ocular lens compositions and a method of formation wherein the first polymer component is selected for producing desirable characteristics in addition to high gas permeability in the lens, the additional desirable characteristics being selected from the class consisting of comfort as determined by flexibility or rigidity, wettability, bio-compatibility, soil resistance, and dimensional stability.

Even more preferably, the first polymer component is a block co-polymer formed from first and second monomers. The first and second monomers are preferably selected for providing or enhancing different characteristics in the ocular lens composition as noted above. In specific examples set forth below, the first and second monomers of the first polymer component may be combinations selected from the classes consisting of silicones and polycarbonates.

The ratio of the first and second polymer component within the GP ocular lens composition is critical to the invention. Generally, the invention contemplates a relatively small proportion of the second polymer component added to a relatively large proportion of the block copolymer forming the first polymer component in order to impart specific properties considered important to an improved contact lens according to the present invention.

More specifically, since the silicone component of the block copolymer contributes high oxygen permeability to the lens and contributes comfort due to its flexible nature, it is an objective of this invention to provide significantly high levels of the oxygen permeability/comfort-flexibility contributing components.

It is a still further related object of the invention to provide ocular lens compositions and a method of formation wherein the second polymer component is selected for varying one or more characteristics of the ocular lens composition as listed above in order to meet the requirements of different ocular lens applications.

Within the various embodiments of the invention as summarized above, certain components such as the first and second polymer components and the first and second monomers may be selected from references such as those noted above. However, the present invention further requires the combination of those components to achieve the specified characteristics as noted above and to form an interpenetrating polymer network (IPN), preferably with the second polymer component as a thermoplastic IPN component with respect to the first polymer component. This thermoplastic IPN does not depend upon crosslinking to achieve compatibility among the components. Compatibility is essential to achieving the transparency required by a contact lens. Achieving compatibility through crosslinking will, a priori, diminish the permeability desired for an extended wear contact lens.

It is again emphasized that the thermoplastic IPN structure referred to above is essential within the ocular lens compositions of the present invention. In that regard, an understanding of the combined materials in the ocular lens compositions of the present invention is believed to be best provided by nomenclature developed by L. H. Sperling in his text, *Interpenetrating Polymer Networks and Related Materials*, Plenum Press, New York, N.Y. (1981). This text is accordingly incorporated herein, particularly Chapter 3 which specifically deals with nomenclature as referred to above. In general, the Sperling nomenclature is technically valid and has been proposed as a standard approach to naming complex polymer mixtures. The Sperling nomenclature is also particularly useful in connection with the present invention in order to distinguish the interpenetrating network structure of the invention over various prior art references.

The Sperling nomenclature answers three questions about the chemical entity of the IPN which are not answered by conventional chemical nomenclature. These three features include: (1) the identities of the polymers being combined; (2) the principal modes of combination; and (3) the time sequence or addition sequence of the reaction or reactions forming the entity.

For example, at least one of the examples of the present invention as described below includes a thermoplastic block co-polymer which is prepared first. The block co-polymer subsequently becomes part of an IPN through the addition of one or more monomers. This is an example of a sequential IPN because the block co-polymer is formed first and the additional polymer is subsequently created within the structure of the block co-polymer, in solution.

The combination of the two components or monomers in the block co-polymer is indicated by the link "b" and the subsequent reaction of further monomers to form the IPN is indicated by the link "i". Thereafter, if P1 and P2 indicate the polymeric chains of a block co-polymer and P3 represents a polymer later created in the presence of the block co-polymer to form an IPN, then the general form of the combination or composition of the present invention may be shown as:

(P1-b-P2)-i-P3.

This is accordingly a broad statement of the thermoplastic IPN structure for the present invention, at least where the first polymer component is a block co-polymer. The sequence of formation or combination of the elements of the IPN is represented by the left-to-right orientation of the name.

As a further example, the IPN described below in Example 1 may therefore be described as: [poly (dimethylsiloxane)-b-poly(carbonate)]-i-poly(methyl methacrylate) or, the IPN structure may be abbreviated as follows:

[PDMS-b-PC]-i-PMMA;

wherein, according to widely-accepted abbreviations, PDMS signifies poly(dimethylsiloxane); PC signifies bisphenol A poly(carbonate); and PMMA signifies poly (methyl methacrylate).

It will be apparent from the following description that other interpenetrating polymer network structures defined in accordance with the present invention may be represented in similar fashion by the Sperling nomenclature set forth above.

By contrast, to further define the ocular lens compositions of the present invention, the interpenetrating polymer network structure or portions thereof may also be represented by conventional chemical nomenclature which, however, as noted above, does not indicate the order of formation or combination for various components. For example, the block co-polymer of Example 1 as referred to above and discussed in greater detail below, may be identified by the chemical nomenclature

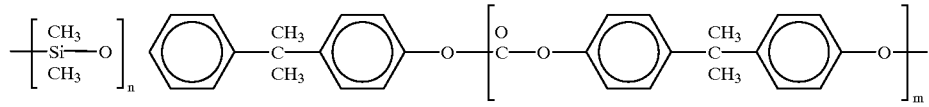

In the above structure, a first monomer component is indicated in brackets with the subscript n indicating the number of repeating units of that monomer. Similarly, a second monomer is also indicated in brackets with the subscript m indicating the number of repeating units for the second monomer. In a typical formulation, n may equal approximately 20, for example, and m may vary, for example, from about 3.5 to about 70.

More broadly, the block co-polymer may be represented by the nomenclature $X_n r Y_m$, where X represents a first monomer or monomer component, Y represents a second monomer or monomer component, and r is a linking substituent. The subscripts n and m are as defined above. It will be apparent that a broad range of block co-polymers can be signified by this structure.

It is again noted that block co-polymers as represented above are disclosed by various references such as the Noshay article referred to above. Block co-polymers are basically different from random or collinear polymers as disclosed in certain of the other references above. More specifically, the block co-polymers are formed with identifiable repeating sequences providing predictable characteristics of specific polymers unlike the random or alternating distribution of linear co-polymers as discussed above.

Additional features are either contemplated by the present invention or are possible in combination with the composition of the invention.

Additional modifications and variations in the present invention will be apparent from the following description having reference to the accompanying drawing and also with specific reference to the individual examples set forth below.

DESCRIPTION OF THE PREFERRED EMBODIMENTS

Figure 1:
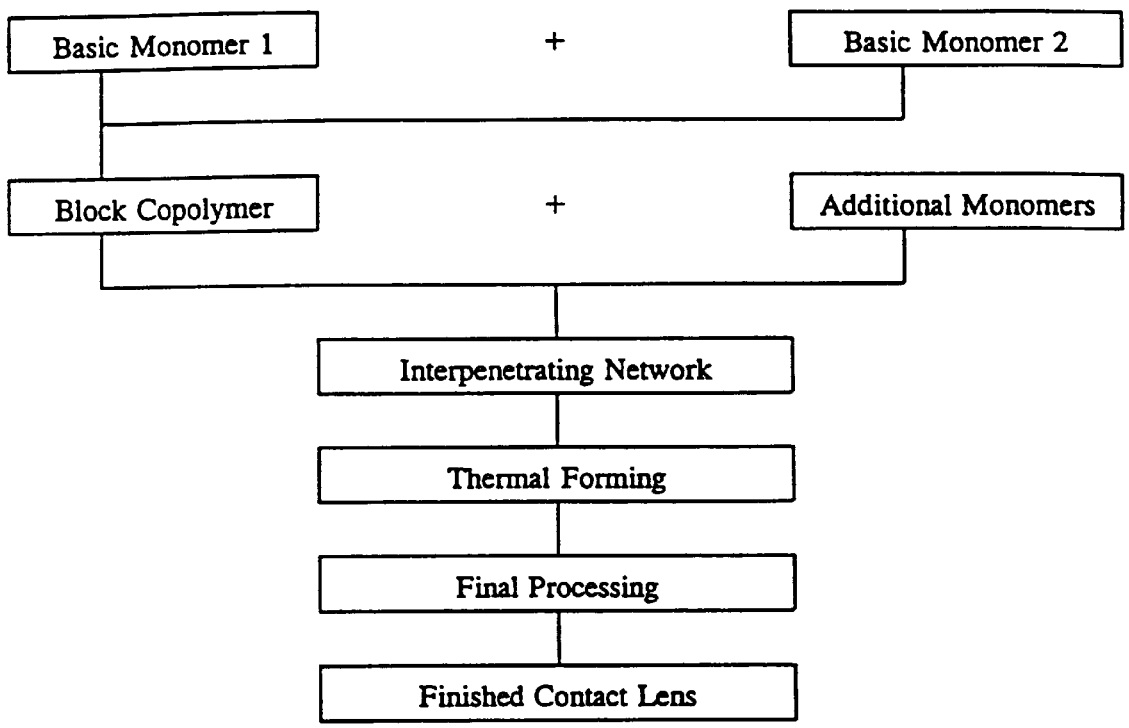
FIG. 1 is a flow sheet broadly illustrating steps for forming a gas permeable contact lens composition according to the present invention.

As noted above, the invention relates to an ocular lens composition and method of preparation wherein first and second polymer components are combined in an interpenetrating polymer network to form the gas permeable ocular lens composition, the second polymer component preferably providing an interpenetrating network with respect to the first polymer component.

As further noted above, the first and second polymer components are respectively selected for providing selected characteristics within the GP ocular lens composition. Preferably, the second polymer component is selected for providing basic GP lens characteristics including structural stability, wettability, desired refractive index as necessary in any lens composition, and the ability to additionally tailor flexibility or rigidity as desired. At the same time, the first polymer component is selected for providing additional desired characteristics in the GP lens composition, particularly characteristics adapting the contact lens for extended or long term use. For that reason, the first polymer component is preferably selected for providing necessary characteristics such as high gas permeability and flexibility or rigidity as desired for comfort, and also additional desirable characteristics selected, for example, from the class of characteristics consisting of structural stability, thermoplasticity, wettability, user compatibility, and soil resistance.

As noted above, the first and second polymer components may thus be selected from references such as those noted above which disclose various polymers and characteristics which they tend to develop in contact lens compositions. As a specific example, a number of the references disclose the use of methacrylates as a basic component forming rigidity and structural stability in the lenses. To the extent that the references are of assistance in understanding or broadening the scope of the present invention, they are incorporated herein by reference.

However, the present invention further requires selection of the first and second polymer components in combination for forming a thermoplastic composition having optical clarity and compatibility and facilitating low cost formation of the ocular lens by techniques commonly referred to as molding or thermoforming.

Within the invention as summarized above, the desirable characteristic of thermoplasticity is preferably produced by the first polymer component. For that purpose, the first polymer component may include, for example, polymers such as polycarbonates, polysulfone and polystyrene. Additional polymers suitable for producing thermoplasticity in the ocular lens composition are disclosed, for example, by the Noshay reference which is also incorporated herein by reference for that purpose.

More preferably, the first polymer component is formed as a block co-polymer from first and second monomers which, in turn, are selected for achieving different characteristics in the finished GP ocular lens composition. In this manner, even greater versatility is achieved for the GP ocular lens of the invention.

As one example, the first monomer may be selected for primarily achieving the desired characteristic of oxygen permeability in the GP ocular lens composition and may include polymers such as silicones, fluorine polymers and dimethyl pentene, as well as possibly other polymers for that purpose.

At the same time, the second monomer may be selected, for example, to achieve desired thermoplasticity in the final GP contact lens composition and may include one or more of the resins noted above.

The first and second monomers may be combined into a block co-polymer according to various known techniques with the block co-polymer forming the first polymer component of the invention.

The use of the first and second polymer components within an interpenetrating polymer network as noted above provides additional advantages in GP ocular lenses including the ability to vary basic characteristics such as rigidity or hardness (within a suitable range for GP lenses) and gas permeability. For example, rigidity may be adjusted by selecting different types of polymers for the second polymer component while permeability may probably be most readily varied by selecting the appropriate polymer either in the first polymer component or in the first monomer of the first polymer component which is primarily responsible for permeability.

It is particularly important that the first and second polymer components be selected in combination for forming a thermoplastic composition having optical clarity and compatibility. Thermoplasticity is an essential feature of the composition of the present invention in order to permit the use of low cost techniques such as molding or thermoforming. These low cost techniques, in turn, particularly adapt the ocular lens composition of the present invention for use in disposable contact lenses.

The interpenetrating network of the contact lens composition of the present invention is formed by solution polymerization in order to further enhance optical clarity as discussed in greater detail below. More preferably, the interpenetrating network of the lens composition is formed by solution polymerization with a relatively high concentration of a free radical initiator of greater than 0.9 molar percent of monomer, preferably at least about 1.0 molar percent of monomer and more preferably at least about 1.2 molar percent of monomer.

Solution polymerization is classically defined as a reaction in which the reactants are dissolved in a suitable organic solvent, the solvent serving as a vehicle in which the polymerization reaction takes place. The technique has the advantage of permitting easier removal of heat produced by the reaction and, therefore, easier control of the reaction. Moreover, solution polymerization is more likely to follow known theoretical kinetic relations and therefore offers certain advantages such as the ability to be scaled up more readily. Finally, in the production of contact lenses, the polymer solution can be easily filtered and cast to further assure optical clarity and a fixed thickness for the lens blank used in the matched die molding which is the next step of the lens manufacturing process.

The preceding definition of solution polymerization is taken from a publication by Stephen L. Rosen, entitled *Fundamental Principles of Polymeric Materials*, pp. 179–181, John Wiley & Sons, New York, N.Y.

Within the solution polymerization of acrylic monomers, both diacyl peroxides and azo compounds are frequently used as free-radical initiators. Examples of diacyl peroxides include benzoyl peroxide, 4-chlorobenzoyl peroxide, 2,4-dichlorobenzoyl peroxide, isobutyroyl peroxide, acetyl peroxide, propionyl peroxide, lauryol peroxide, decanoyl peroxide and diisopropylperoxydicarbonate. Azo compounds suitable for these polymerization reactions are exemplified by 2,2'-azobis(isobutyronitrile), 2,2'-(2-methylbutyronitrile), 1,1'-azobis(cyclohexane-carbonitrile), and 2,2'-azobis(2,4-dimethylvaleronitrile). Suitable monomers with which these initiators are used are disclosed elsewhere herein.

Benzoyl peroxide is one particularly representative example of a free radical initiator for use in the present invention as indicated further below in the experimental section. As will be made apparent in the experimental section, it is particularly contemplated that the initiator be present in the reaction in a concentration greater than 0.9 molar percent of monomer, preferably more than 1.0 molar percent of monomer and more preferably greater than about 1.2 molar percent of monomer. These values were experimentally established particularly with benzoyl peroxide as the initiator. However, similar concentrations are also contemplated for other free radical initiators such as those listed above.

At the same time, thermoplastic compositions have other advantages in applications contemplated by the present invention, such as the ability to form different molded sections of the lenses to achieve different characteristics using a thermoplastic lamination process to produce the following types of lenses:

(a) A lens with a relatively rigid center and a relatively flexible skirt formed by thermoplastically laminating a rigid central disc to a soft annular ring. Such a lens has superior qualities for masking severe astigmatism at low cost because the more rigid center provides the optical quality required to correct the astigmatism and the more flexible skirt provides the comfort and high oxygen permeability; and (b) A cosmetic lens with the emulsion from a photograph of an actual iris thermoplastically laminated between two thin discs of material (a phototransfer) providing the most life-like cosmetic lens possible for use with disfigured eyes or as a greatly-improved eye color change lens.

The method by which GP lens compositions are formed according to the present invention is broadly illustrated in FIG. 1 which is a flow diagram illustrating the preferred use of first and second monomers for forming a first polymer component which is then combined with a second polymer component as discussed above to achieve various characteristics in the resulting GP lens composition. Additional post-polymerization techniques are also set forth in the flow chart of the figure to further enhance characteristics of the finished GP contact lens composition. As noted above, the final step in the method or flow chart is the molding or thermoforming of the IPN related first and second polymer components to produce the GP lens composition of the invention.

The GP lens composition and method of formation as discussed above are further exemplified by the following experimental material.

Experimental Section

The following examples are set forth for the purpose of further clarifying the content and scope of the present invention.

EXAMPLE 1

A polymerization tube was charged with 1.5 grams of a block co-polymer of poly(dimethylsiloxane) and poly (carbonate) based on bisphenol-A. (See Howard A. Vaughn, "The Synthesis and Properties of Alternating Block Polymers of Dimethylsiloxane and Bisphenol-A Carbonate," in *Polymer Letters*, Vol. 7, pp. 569–572 (1969). (Also see U.S. Pat. No. 3,419,534 issued Dec. 31, 1968 and U.S. Pat. No. 3,419,635 also issued Dec. 31, 1968, both to Vaughn. Also, see D. G. LeGrand, "Mechanical and Optical Studies of Poly(dimethylsiloxane) Bisphenol-A Polycarbonate Co-polymers", in *Polymer Letters*, Vol. 7, pp. 579–585 (1969). These references are incorporated herein to disclose the manner of forming the block co-polymer employed in Example 1.

The polycarbonate comprises between about 40 to 45% by weight of the block co-polymer and the polydimethylsiloxane comprises about 60 to 55% by weight of the block co-polymer. Dichloromethane was added to partially fill the tube and the block co-polymer was dissolved therein.

To the tube was added 0.5 ml of monomeric methyl methacrylate, without a stabilizer, and 0.72 milligrams of benzoyl peroxide dissolved in dichloromethane.

The polymerization tube was then filled with dichloromethane and tightly capped. The tube was heated to 80 to 90° C. for 18 hours. The resulting solution was a clear, very light straw-colored liquid.

The solution was cast on a glass plate and the dichloromethane allowed to evaporate in a stream of filtered air. A transparent film was formed on drying. The film was washed in heated distilled water and dried in a particle free environment.

Small circular blanks were cut from the film and placed in a matched die mold formed to the contours of a contact lens. The mold was heated to a temperature of 100 to 150° C. and then slowly cooled to room temperature. A formed film was removed from the mold and edged.

The film in Example 1 comprised a contact lens according to the present invention and included various desired characteristics resulting from the interpenetrating network structure including the first and second polymer components referred to in Example 1.

EXAMPLE 1A

This example represents a range of compositions as variations of Example 1. The purpose of this example is to demonstrate the breadth possible for the ratios of monomers in the block copolymer and also to identify a relatively broad range of monomers suitable for use therein.

Initially, Example 1 was specific to a polycarbonate comprising between about 40 to 45% by weight of the block copolymer and polydimethylsiloxane comprising about 60 to 55% by weight of the block copolymer. In this example, it is to be understood that substantially broader ranges are possible. Generally, it is contemplated that the siloxane monomer may preferably comprise about 25 to 85% by weight of the block copolymer as noted for example in a paper by A. Barrie, M. J. L. Williams and H. G. Spencer, "Gas Transport in Heterogeneous Polymer Blends," *Journal of Membrane Science*, 21 (1984) 185–202, Elsevier Science Publishers B. V. Amsterdam. That reference is incorporated together with the other references noted above for purposes of fully disclosing possible compositions for use in the present invention. At the same time, the other monomer may comprise from about 75 to about 15% by weight of the block copolymer. Even more broadly, it is contemplated that the siloxane monomer may comprise from about 10 to about 90% by weight of the block copolymer, the balance being the other monomer.

As for possible identities of the first and second monomers in the block copolymer, the first monomer is preferably a siloxane compound with the other monomer being selected from a relatively broad range of compounds. Examples of monomers for the block compound are identified in a table on pages 393-394 of the Noshay reference noted above. That reference is also incorporated herein. More specifically, the first monomer may comprise methylphenylsiloxane (C block=dimethylsiloxane), dimethylsiloxane, siloxanes, phenylmethylsiloxane, aluminosiloxane. The other monomer may at the same time comprise diphenylsiloxane, phenylmethylsiloxane, phenylsilsesquioxane, tetramethyl-p-silphynsylenesiloxane, tetramethyl-1,4-naphthalenesiloxane, tetramethyl-1,3-tetrafluorophenylenesiloxane, alkylene ethers, polysulfone, poly(phenylene oxide), isoprene, styrene, α-methylstyrene, α-methylstyrene-styrene, bisphenol A carbonate, 9,9-Bis(4-hydroxyphenyl)fluorene carbonate, tetrabromobisphenol A carbonate, 2,2,4,4-tetramethyl-1,3-cyclobutylene carbonate, bisphenol A isophthalate, bisphenol A terephthalate, hexamethylene terephthalate, τ-benzyl L-glutamate, nylon 6, urethane, urea, imide. It is noted that although the second monomer may be selected from a variety of compounds, the first monomer is preferably dimethylsiloxane.

Except for the ratios and specific identities of the monomers as set forth above, Example 1A is otherwise generally similar to Example 1. It is to be noted that some variations may be necessary between this example and Example 1, for example, the selection of solvents. However, the selection of such solvents would be generally known to those skilled in the art.

Examples 1 and 1A, as well as the other examples set forth hereinbelow, demonstrate the unexpected novelty and utility of the lens composition and method of the present invention to form lens compositions having desirable characteristics of flexibility, moldability and gas permeability. These characteristics, particularly the level of gas permeability, make the contact lens of the invention particularly suitable for extended wear.

EXAMPLE 1B

This example is also a variation of Example 1. Duplicate polymerization tubes were prepared as in Example 1 with the quantities of reactants noted in Table 1A below. As in Example 1, methylene chloride was the solvent, the copolymer and the benzoyl peroxide initiator being dissolved separately and then mixed with the methyl methacrylate monomer.

TABLE 1A

| SAMPLE DESIG-NATION | BLOCK COPOLYMER gms | MMA MONOMER millimoles | BENZOYL PEROXIDE INITIATOR millimoles | CONC. INITIATOR AS MOLAR % OF MMA |
|---|---|---|---|---|
| A | 31.5 | 95 | 0.64 | 0.69 |
| B | 31.5 | 95 | 0.86 | 0.91 |
| C | 31.5 | 95 | 1.29 | 1.36 |

The tubes were heated to 90 degrees Celsius (90° C.) for 24 hours. Formulation A yielded cloudy solutions which cast to cloudy films unsuitable for optically clear contact lenses. One of the tubes in formulation B was cloudy in solution; the other was clear. Films cast from both tubes of formulation B were cloudy or possessed of a bluish haze making them unsuitable for optically clear contact lenses. Both tubes from formulation C were clear in solution and cast to films suitable for optically clear lenses.

The series of formulations in Table 1A demonstrate the unexpected sensitivity of these formulations to initiator concentration. Generally, in the art of methylmethacrylate polymerization, particularly, benzoyl peroxide levels of 0.1% or lower are suitable for successful polymerizations. However, it is believed that in this case, the higher levels of benzoyl peroxide have the effect of minimizing the chain length of the poly(methyl methacrylate). Shorter PMMA chains are believed to yield compatible IPNs which do not possess microphase separation. As noted above, incompatibility results in cloudy films which are unsuitable for optically clear contact lenses.

Although Example 1B was carried out with benzoyl peroxide as the free radical initiator, it is believed that the general concentration levels indicated in Example 1B also apply to the other free radical initiators listed above. Accordingly, Example 1B indicates the desirability for a free radical initiator in a solution polymerization reaction according to the present invention of greater than about 0.9 molar percent of monomer, preferably at least about 1.0 molar percent of monomer and more preferably at least about 1.2 molar percent of monomer.

Generally, although the concentration of 0.91% benzoyl peroxide was marginal and possibly not acceptable for most lens applications, taken in the context of Example 1B and Table 1A, it is believed to establish a general minimum concentration of initiator according to the invention. Similarly, an initiator concentration of at least about 1.0 molar percent of monomer is believed to be sufficiently higher than formulation B of Table 1A to provide acceptable characteristics for most lens applications. Certainly the higher minimum concentration of about 1.2 molar percent of monomer is believed to provide good characteristics in contact lens applications. That minimum value is close to the initiator concentration of 1.36 molar percent of monomer in formulation C which was found to provide excellent characteristics, particularly in terms of optical clarity. Furthermore, it is believed that an increase of initiator concentration substantially above the concentrations discussed above and set forth in Example 1B would not result in any further substantial advantage for the resulting composition. More specifically, it is anticipated that little additional benefit would be achieved from initiator concentrations of about 1.5 molar percent of monomer or greater.

The values discussed above and the compositions set forth in Example 1B are believed to demonstrate an unexpected sensitivity of the lens formulations to initiator concentration and to add to patentable novelty of the invention. In this regard, the prior art regarding MMA polymerization has generally taught the use of benzoyl peroxide levels of about 0.1 molar percent of monomer or lower as an initiator for successful polymerization. Accordingly, the present invention unexpectedly teaches the use of initiator levels of about a full order of magnitude greater than anticipated in the prior art.

It is also noted again that the concentrations indicated in Example 1B and Table 1A are also believed representative for other monomers and free radical initiators as described and listed elsewhere herein.

It is also particularly important to note that the minimum initiator concentrations discussed above are preferably contemplated in a solution polymerization reaction as described above. Example 1 and other examples herein are representative of such solution polymerization reactions which achieve the desired characteristics of the present invention. Example 1B thus combines both solution polymerization and a minimum concentration of free radical initiator to provide a particularly desired combination of features according to the present invention, particularly optical clarity in a gas permeable lens preferably suitable for extended wear.

EXAMPLE 2

Figure 2:
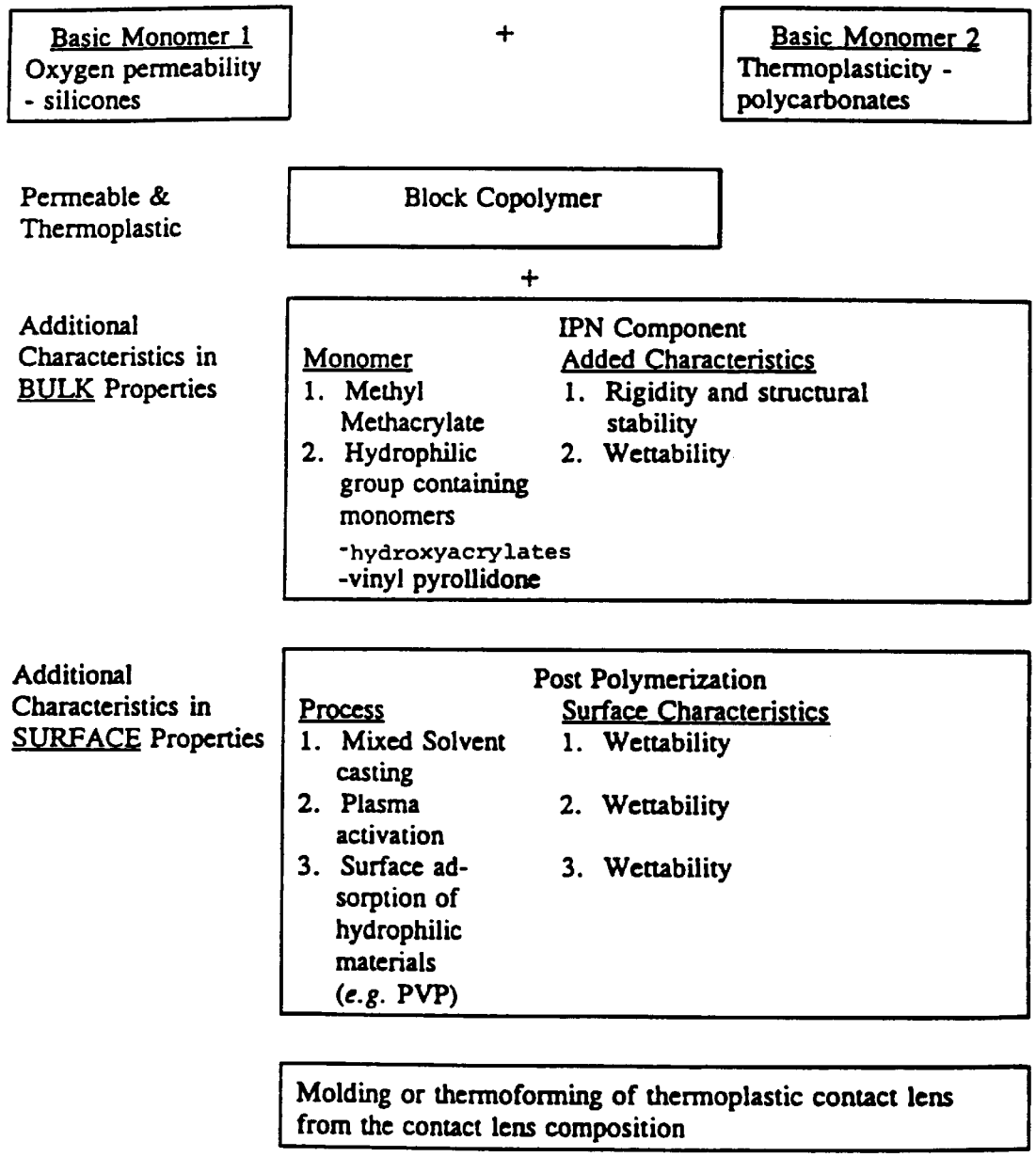
FIG. 2 is a flow sheet generally similar to that of FIG. 1 but specific to a preferred embodiment of the invention.

This example represents a series of compositions which are also graphically illustrated in FIG. 2. Briefly, the steps of Example 1 were repeated with the percentage of the second polymer component methyl (methacrylate) (MMA) being present in percentages of the entire composition ranging from about 0 to about 25. Table 1B represents oxygen permeability Dk ($\times 10^{-11}$) in units of [($cm^2$/sec).($mlO_2$/ml$\times$mmHg)] for each of the different compositions. The various concentrations of the second polymer component and corresponding permeabilities are also represented in tabular form below:

TABLE 1B

| Oxygen Permeability Dk ($\times 10^{-11}$) | Second Polymer Component (MMA) Concentration (Percentage of entire composition) by weight |
|---|---|
| 180 | 0.0 |
| 141 | 5.0 |
| 105 | 9.0 |
| 62 | 22.0 |
| 49 | 25.0 |

The formed films produced for each of the compositions set forth above also provided an optically clear/compatible composition suitable for use in contact lens compositions.

In addition, the multiple compositions set forth in Example 2 represent a preferred manner of varying the amount of one component in the lens composition for sequentially adjusting a preferred characteristic such as oxygen permeability. It is further to be noted that the composition could similarly be varied for adjusting other desired characteristics such as rigidity/flexibility or structural stability, for example.

The contact lens compositions of the present invention are described for example in Example 2 and elsewhere herein with particular reference to oxygen permeability. In this regard, oxygen permeability is considered to be a particularly important indicator because it is an absolute value for the composition without reference to thickness of the lens or other dimensional factors. By contrast, equivalent oxygen percent (EOP) is a corresponding value discussed in connection with contact lenses, for example, as discussed by John K. Fitzgerald in a paper entitled "Understanding Permeability and Wettability", in *The Contact Lens Journal.*

Although specific EOP values have not been measured for the compositions of the present invention, it is clearly anticipated that the compositions contemplated for the invention and specifically disclosed in the experimental section will have EOP values for the lenses formed according to the present invention clearly exceeding a minimum value of about 10% which is considered to be essential or at least necessary for satisfactory extended wear contact lenses by Fitzgerald and others.

The concept of EOP as a method of describing oxygen permeability of contact lenses and the like was also described in an article by Loshaek S., Hill R. M., "Oxygen Permeability Measurements: Correlation Between Living-Eye and Electrode Chamber Measurements", *International Contact Lens Clinic*, (November-December 1977, pp. 26–29). The articles by Hill and Fitzgerald are incorporated by reference as though set forth herein in their entirety.

EXAMPLE 3

The steps of Example 1 were again repeated. However, in addition to the monomeric methyl methacrylate, a range of 0.5 to 2.5% by weight (total solids) of N-vinyl-2-pyrolidone was added to the solution. The resulting films within the above range exhibited enhanced surface wetting characteristics as demonstrated by examination of the contact angle of distilled water on the polymer film surface.

EXAMPLE 4

The steps of Example 1 were again repeated. However, in addition to monomeric methyl methacrylate, 0.5 grams of acrylamide and 0.2 grams of 2, hydroxyethyl methacrylate were added to the polymerization mixture in separate compositions.

Cast films formed from both of the compositions in Example 4 showed wetting angles with distilled water, relative magnitude being indicated as: PMMA alone>2, hydroxyethyl methacrylate addition>acrylamide addition.

EXAMPLE 5

The steps of Example 1 were again followed. However, in place of the methyl methacrylate monomer as the second polymer component, monomeric styrene was added to the [PDMS-b-PC] block co-polymer solution.

Different compositions were formed with the monomeric styrene varying from about 1 to at least about 5% of the composition by weight.

Films formed from the above compositions each illustrated optical clarity and accordingly polymer compatibility in accordance with the present invention.

Steps of the preceding examples may also be carried out employing different polymers, for example those listed above while realizing generally similar advantages of the invention.

EXAMPLE 6

The steps of Examples 1 and 2 were again followed. The thermally formed lenses produced in this example were treated in a chamber designed to create different plasma surface treatment environments. The lens treatment consisted of three process steps, each using a primary gas plasma created at a frequency of 13.56 MHz. The first process involved exposing the lens to an oxygen plasma, the second was a plasma created with methane, and the third step repeated exposure to an oxygen plasma. The lenses so treated exhibited enhanced surface wettability as demonstrated by examination of the contact angle of distilled water on the lens material and tear break-up time experiments on the lenses themselves.

The previous examples were early examples which demonstrated a number of general characteristics of the scope of the invention.

The following examples included clinical evaluations demonstrating more specifically how the choice of polymers and/or monomers and the proportions thereof can be selected to achieve a certain type of contact lens with certain desired characteristics.

EXAMPLE 7

The objective of this example was to obtain a non-water-based, highly flexible "soft" lens. That is, a lens that has the immediate comfort and fit characteristics of a soft water-based hydrogel lens, but, because of the absence of water, does not suffer from dehydration causing less sharp vision and eye irritation. In addition, another objective was to avoid the potential for microorganism infection caused by the water-based nature of the soft hydrogel lenses.

The steps of Example 1 were followed with the high rigidity monomeric methyl methacrylate (see Table 2) being replaced by butyl acrylate, yielding a polymer tending to be much more flexible than polymethyl methacrylate. Small circular blanks were cut from the resulting film and placed in a thermal pressure molding apparatus with molds designed for a specific subjects' prescription at a 14 mm lens diameter, the standard hydrogel lens diameter. The temperature was increased to 165° C. under pressure and slowly cooled to room temperature. The resulting contact lens was 14 mm in diameter with a 0.2 mm center thickness. The replacement of the methyl methacrylate with butyl acrylate resulted in a lens of generally the same gas permeability but one of much greater flexibility (Table 2 indicates a factor of eight increase in flexibility) which had a feel similar to the feel and comfort of a soft hydrogel lens. Upon undergoing the plasma surface treatment described in Example 6, the lens was clinically tested in the subject's eye. The results indicated a non water-based lens that had the initial comfort of a hydrogel soft lens and the superior visual acuity characteristics of an RGP lens.

The flexural modulus values discussed in Example 7 with reference to Table 2 are capable of correlation with the ratio of the first and second polymer components as discussed typically in Example 2. Sources of the data in Table 2 are indicated by parenthetical numbers corresponding to the footnotes following Table 2.

Referring to both of these examples in combination, the present invention generally contemplates a preferred range for the second polymer component of about 2–30% by weight. That range is selected primarily for purposes of maintaining desired gas permeability within the resulting GP lens.

TABLE 2

APPROXIMATE FLEXURAL MODULUS OF KEY MATERIAL COMPOSITIONS REFERRED TO IN EXAMPLES

| | MATERIAL | | FLEXURAL MODULUS | | |
|---|---|---|---|---|---|
| | | | dynes/cm$^2$ | psi | Ratio |
| MOST RIGID | Polymethyl Methacrylate (100%) | (1) | $2.8 \times 10^{10}$ | 400,000 | 1.0 |
| | Polydimethylsiloxane polycarbonate(2) (10%) -i- polymethyl methacrylate (90%) | (2) | $2.6 \times 10^9$ | 370,000 | $9.3 \times 1^1$ |
| | Polydimethylsiloxane polycarbonate (75%) -i- polymethyl methacrylate (25%) | (3) | $2.8 \times 10^9$ | 40,000 | $1.0 \times 10^{-1}$ |
| | Polydimethylsiloxane polycarbonate (990%) -i- polymethyl methacrylate (10%) | (3) | $2.5 \times 10^9$ | 36,000 | $9 \times 10^{-2}$ |
| | Polydimethylsiloxane polycarbonate (75%) -i- butyl acrylate (25%) | (3) | $3.5 \times 10^8$ | 5,000 | $1.3 \times 10^{-2}$ |
| MOST FLEXIBLE | The Cornea of the Eye | | $1 \times 10^8$ | 1,500 | $3.6 \times 10^{-3}$ |
| | Typical Hydrogel (PolyHEMA) | (4) | $5 \times 10^7$ | 750 | $1.8 \times 10^{-3}$ |

1. Modern Plastics Encyclopedia, McGraw Hill 1984–1985.
2. Arkles U.S. Pat. 4,478,981 issued October 23, 1984.
3. Experimentally determined values.
4. Contact Lenses, Vol. 2, Chap. 13, edited by J. Stone and A. J. Phillips, Buttersworths, 1981.

Referring also to Example 7, it may be seen that the flexural modulus of the lens generally correlates with the ratio set forth above but also with the specific identity of the second polymer component. Generally, a range of flexural modulus values for the present invention encompasses about 2,000–50,000 psi, more preferably about 5,000–40,000 psi and most preferably about 20,000–40,000 psi.

These flexural modulus values are also selected based on the possibility of substitution particularly for the second polymer component. For example, the flexural modulus for the resulting lens may be varied either by changing the ratio of the first and second polymer components or by varying the second polymer component itself. For example, a substantially lower flexural modulus would result by substituting a polymer such as butyl acrylate in place of methyl methylacrylate.

Figure 3:
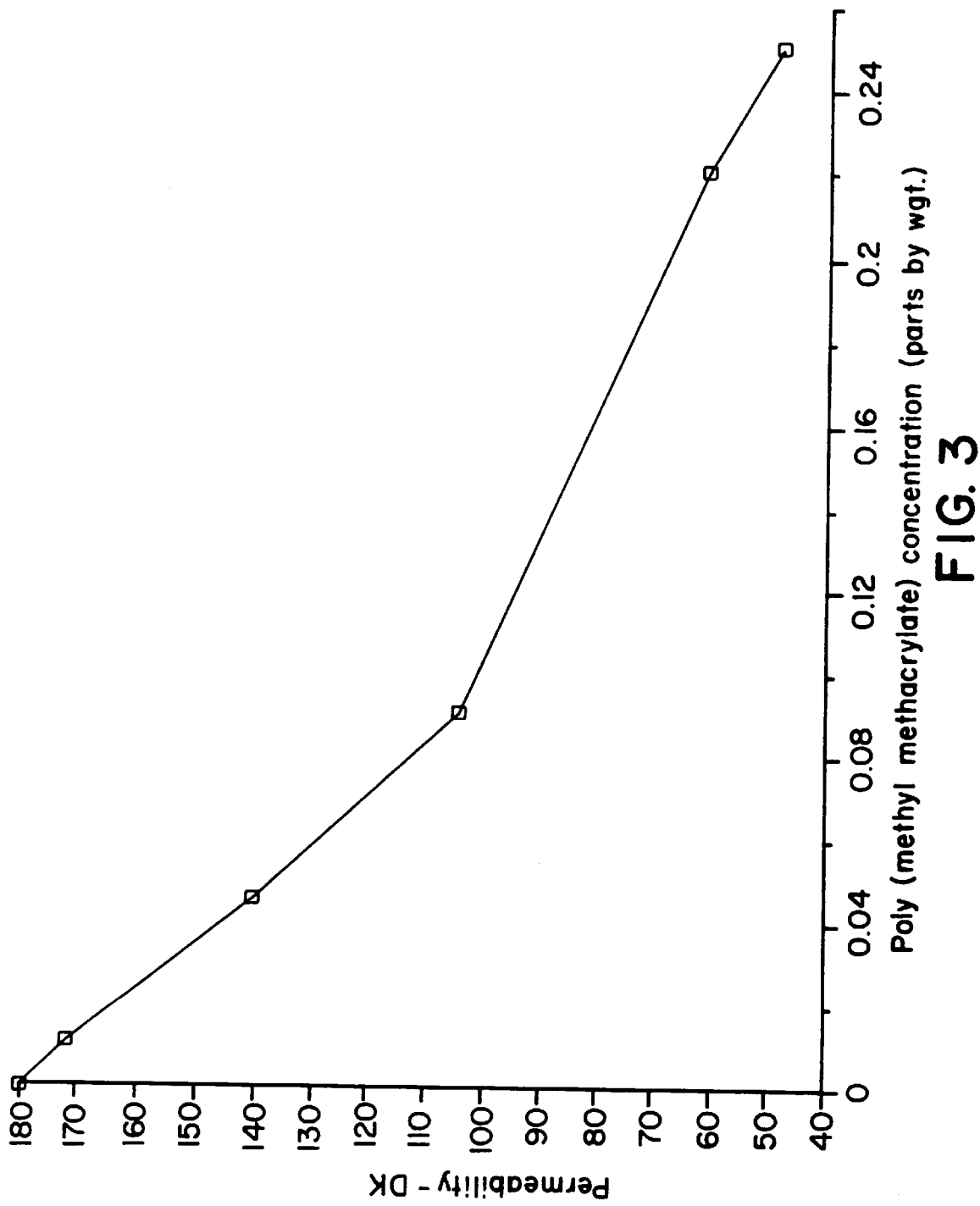
FIG. 3 is a graphical representation of oxygen permeability for a relatively wide range of compositions described in Example 1.

The inverse relationship between permeability and stiffness in contact lenses is well established. See for example FIGS. 3 and 4 in a paper by Irving Fatt, "Performance of Gas Permeable Hard Lenses on the Eye", *Transactions of the British Contact Lens Association*, 1986, pp. 32–37.

EXAMPLE 8

The objective of this example was to produce a superior 10–11 mm diameter RGP type lens with very high oxygen permeability. The steps of Example 1 were followed with the proportion of monomeric methyl methacrylate reduced to approximately 10% by weight of the total composition. Small circular blanks were cut from the resulting film and placed in a thermal pressure molding apparatus with molds designed for a specific subjects prescription in a 10.5 mm diameter with typical RGP lens design characteristics. The temperature was increased to approximately 165° C. under pressure and slowly cooled to room temperature. The resulting contact lens was 10.5 mm in diameter with a 0.15 mm center thickness. The lens was then clinically tested in the subjects eye. It was found to be more comfortable than a typical hard RGP lens because of its increased flexibility (see FIG. 4) and translated well under blinking on the eye, because the 10% MMA concentration added sufficient rigidity such that blinking did not overly deform the lens. The relative permeability, Dk, as noted in Example 2, was approximately 100, which is generally considered a very high permeability. The wettability of the lens under clinical evaluation was determined to be adequate without any additional surface treatment.

EXAMPLE 9

The objective of this example was to produce a superior scleral lens which is often used on subjects having pathological eye conditions caused by poor corneal grafts or keratoconus. A typical scleral lens is 16–22 mm in diameter whose optic portion of approximately 13–14 mm diameter vaults over the cornea such that it does not contact it and only makes contact on the outer sclera.

The steps of Example 1 were followed with the methyl methacrylate composition chosen to be approximately 25% of the total. Circular blanks were again placed in the thermal pressure molding apparatus and molded, as in Examples 7 and 8. In this case the mold was designed to produce an 18 mm diameter lens with a 13.5 mm optical vaulted section. The lens was clinically evaluated on a subjects eye and found to be more comfortable than a standard scleral lens, which is typically machined from poly(methyl methacrylate) (PMMA) or hard machinable RGP material. The subject's visual acuity was increased from approximately 200/20 to approximately 30/20 and the resulting lens had a relative oxygen permeability of approximately Dk=50, which is greatly superior to PMMA. In this example, the relatively superior comfort was due to the greater flexibility of the silicone polycarbonate. However, the 25% MMA provided sufficient rigidity for the vaulted section to prevent it from deforming under blinking. Wettability was considered adequate but was subsequently greatly enhanced by surface treatment, as indicated in Example 6.

EXAMPLE 10

Figure 4:
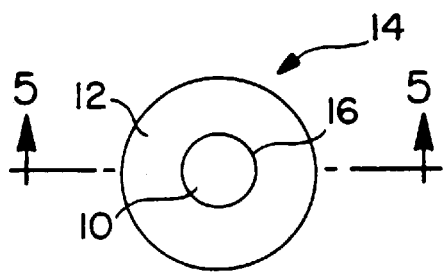
FIG. 4 is a plan view of a contact lens formed in accordance with Example 10.
Figure 5:
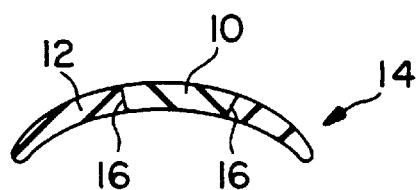
FIG. 5 is an axially sectioned view of the lens of FIG. 4.
Figure 6:
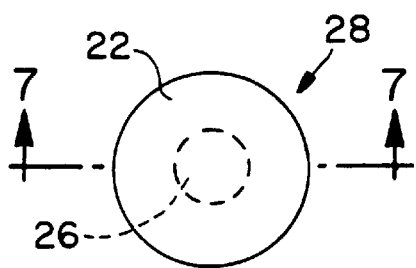
FIG. 6 is a view of a contact lens formed in accordance with Example 11.
Figure 7:
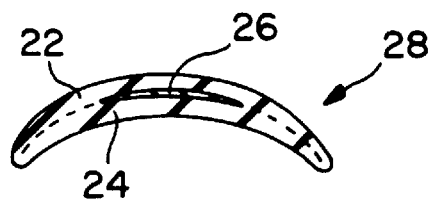
FIG. 7 is an axially sectioned view of the contact lens of FIG. 6.

The objective of this example was to produce a contact lens with improved characteristics for subjects with a high degree of astigmatism. These characteristics include comfort comparable to a hydrogel lens, high oxygen permeability, and, most importantly, sharp, clear vision. A standard soft hydrogel lens cannot readily correct severe astigmatism because the astigmatism is caused by a "football"-shaped cornea. A soft hydrogel lens is so flexible that it drapes over the cornea and, therefore, does not provide adequate vision correction. RGP lenses can correct for astigmatism but suffer from inadequate initial comfort and high cost, as stated earlier. In this example, the thermoplastic nature of the materials was used to laminate a partially rigid center to a very flexible, highly permeable skirt. The steps of Example 7 were followed with a butyl acrylate concentration of approximately 20–25% by weight. Small circular blanks were cut from the film. Then, the steps of Example 1 were followed with a methyl methacrylate composition of approximately 25% by weight. Referring to FIGS. 4 and 5, circular blanks of approximately two-thirds the diameter of the first circular blanks were cut from this film to form blank components such as that indicated at 10. A circular section of approximately one-half the diameter was removed from the larger circular blank with a punch and discarded leaving an annular blank 12. The remaining blanks 10 and 12 were placed in the thermal pressure molding apparatus, as described in the earlier examples (not shown), and were thermoplastically laminated into a lens 14. The resulting lens 14 was 14 mm in diameter with an approximately 9.5 mm center section (formed by the blank component 10) with a smooth clear transition 16 between the two sections.

Upon clinical evaluation it was found that the center section was sufficiently rigid to mask severe astigmatism yet not too rigid to impair comfort, while the outer flexible skirt provided enhanced comfort and relatively high oxygen permeability.

EXAMPLE 11

The objective of this example was to produce a superior lens that becomes a cosmetic cover for a disfigured eye or an extremely life-like iris color-change lens. In this example, the steps of Example 1 were followed. Small circular blanks were cut from the film, which, in this example, was purposely somewhat thinner than previous films. Two circular blanks 22 and 24 were selected for the molding/lamination process to follow. Sandwiched between the two blanks in the mold was an emulsion film 26 of a photograph of the iris of a preselected eye with the pupil removed. The same thermal pressure molding apparatus was utilized as in previous examples to encapsulate the film 26 between the blanks 22 and 24 and form a resultant lens 28 having similar comfort, oxygen permeability and other features previously described but also had an accurately realistic iris for cosmetic or color-change purposes. The emulsion could of course be replaced by other films having a desired image.

The lens compositions demonstrated by the preceding examples provide a number of advantages for lenses formed according to the invention.

Because of the monomer selection for the invention as defined above in the first and second monomer components of the second polymer component, it is possible to achieve a degree of flexibility or softness and, more specifically, a variable range of flexibility (as preferably measured by a lowering of the flexural modulus, see FIG. 4) to enhance the inherent comfort of the resulting lens. Lens flexibility is known to be a major factor in patient acceptance of contact lenses of the type contemplated by the present invention. Furthermore, flexibility of the degree contemplated by the present invention has generally not been possible in the prior art in practical gas permeable (non-hydrogel) lenses, specifically with the lens compositions contemplated by U.S. Pat. No. 4,478,981 issued Oct. 23,1984 to Arkles or U.S. Pat. No. 4,550,139 issued Oct. 29,1985 also to Arkles.

The first noted Arkles patent disclosed a lens system in which a small proportion of a block copolymer was added to a relatively large proportion of poly(methyl methacrylate).

It is to be noted that the ratios between the first and second polymer components of the present invention are in contradistinction to the ratios disclosed in the Arkles patent and, as shown in FIG. 4, lenses of the present invention are approximately 9 to 75 times more flexible.

It is further noted that the small proportions of the block copolymer employed in the compositions of the above noted patent, with a proportionally smaller silicone component, create a lens composition which, in fact, is not only inferior for the types of applications in this invention, but is inappropriate for practical long wearing lenses. Furthermore, the low oxygen permeability levels exhibited for such material are far below those practical for extended wear according to the present invention.

Continuing with reference to the Arkles patents noted above, it is further emphasized that the monomers employed in the first and second polymer components of the present invention are particularly selected in order to contribute to the flexibility of the resulting lens as previously discussed.

It is again emphasized that key features of the lens compositions according to the present invention are transparency and clarity within the resulting lens. This requires that the components of the lens composition be completely compatible. Otherwise small phase boundaries may exist within the resulting lens which will create cloudy conditions. For example, the Arkles patent noted above employed both melt blending and in situ polymerization in order to achieve compatibility between the different components of the lens composition. However, it is believed that these techniques from the above reference results in some loss of clarity and also in the introduction of crosslinking into the polymer structure which has the undesirable effect of minimizing oxygen permeability.

By contrast, the selection of monomers, the ratios of first and second polymer components, the amount of initiator and the methods disclosed for combining these components into the lens composition for the present invention results in superior optical clarity for the lens and maximizes oxygen permeability therein.

The compositions of the present invention are also disclosed in the preceding examples and elsewhere as being suitable for formation of the lens by thermoplastic molding. This offers a novel degree of flexibility in shaping and contouring the lens formed according to the present invention. As noted above, the combination of relatively rigid and relatively flexible thermoplastic materials made possible by the molding techniques contemplated for the present invention permit the creation of lens designs, for example, possessing more rigid central portions in which exact optical corrections can be molded with a more flexible and more comfortable and gas permeable peripheral annulus for the lens.

Furthermore, the materials of the lenses according to the present invention can be molded to, for example, readily vault over portions of the eye where pathological conditions require avoiding direct contact with portions of the cornea or other eye portions. Such molded vaulting designs also provide the opportunity to mask highly astigmatic eye conditions.

Yet another advantage of the present invention is the possibility of employing thermoplastic molding to form or fabricate color changing contact lenses. In this regard, the prior art has disclosed contact lenses which are merely printed or in which colorants are surface or volume embedded. With the present invention, it is possible to duplicate exactly the appearance of an existing eye by photographing it and then capturing the actual photoemulsion containing the image between two thin molded layers of thermoplastic material according to the present invention. Lenses created using photographed images in this manner thus appear more natural than those made using other techniques.

As noted above, certain characteristics of lenses formed according to the present invention can be further enhanced. For example, wettability of the lens may be enhanced by plasma treatment as described above in Example 6. Although the addition of hydrophilic monomers described in Examples 4 and 5 offer one approach to lens wettability, it has been found that when certain plasma treatment methods are used, wettability of the lens can be substantially enhanced.

Tear break-up time is one criterion for practical lens wettability. The longer the tear break-up time, the more wettable, i.e. desirable is the lens. In this test the lens is placed on the subject eye in its normal position. A close-up image of the eye is then videotaped with the patient being directed to blink to wet the lens surface and then to refrain from blinking for as long as possible. The time between the blink and the break-up of the continuous tear fluid film over the lens surface is then noted. Typical tear break-up values for existing RGP contact lenses are in the range of 8 to 20 seconds. Lenses made from the materials and polymer preparation techniques of the present invention have extended tear break-up time(s) ranging from 45 seconds to in excess of 60 seconds.

Accordingly, there has been disclosed above a variety of GP ocular lens compositions and polymer preparation techniques for achieving greatly enhanced characteristics in the lens composition. Additional modifications and variations will be apparent from the preceding description and examples, as well as the following claims which are also set forth by way of example. Accordingly, the scope of the invention is defined only by the following appended claims.

What is claimed is:

1. A thermoformed gas permeable ocular lens comprising an interpenetrating network of a first polymer component comprising about 70–98% by weight of the composition of the lens that is a block copolymer comprising first and second blocks, the first block being selected from silicones and fluorocarbon polymers and the second block being selected from polycarbonates, polysulfones, and polystyrene, and a second polymer component comprising about 30–2% by weight of the composition of the lens that is a polymer of a monomer selected from acrylates, methacrylates, pyrrolidones, styrene, amides, acrylamides, carbonates, vinyls, acrylonitrile, nitriles, sulfones, siloxanes, glycols, ethers, and combinations thereof.

2. The lens of claim 1 where the first polymer component is a silicone-polycarbonate block copolymer.

3. The lens of claim 2 where the first polymer component is a polydimethylsiloxane-poly(bisphenol A carbonate) block copolymer.

4. The lens of claim 3 where the second polymer component is a polyacrylate or poly(methacrylate).

5. The lens of claim 4 where the second polymer component is poly(methyl methacrylate).

6. The lens of claim 1 having a flexural modulus in the range of about 2,000–50,000 psi.

7. The lens of claim 6 having a flexural modulus in the range of about 5,000–40,000 psi.

8. The lens of claim 7 having a flexural modulus in the range of about 20,000–40,000 psi.

9. The lens of claim 1 comprising an interpenetrating network of from 70–98% by weight of the composition of the lens of a polydimethylsiloxane-poly(bisphenol A carbonate) block copolymer and from 30–2% by weight of the composition of the lens of poly(methyl methacrylate).

10. The lens of claim 9 having a flexural modulus in the range of about 2,000–50,000 psi.

11. The lens of claim 10 having a flexural modulus in the range of about 5,000–40,000 psi.

12. A method for producing a thermoformed gas permeable ocular lens, comprising thermoforming into the lens a thermoformable gas permeable ocular lens composition comprising an interpenetrating polymer network of a first polymer component comprising about 70–98% by weight of the composition of the lens that is a block copolymer comprising first and second blocks, the first block being selected from silicones and fluorocarbon polymers and the second block being selected from polycarbonates, polysulfones, and polystyrene, and a second polymer component comprising about 30–2% by weight of the composition of the lens, that is a polymer of a monomer selected from the group consisting of acrylates, methacrylates, pyrrolidones, styrene, amides, acrylamides, carbonates, vinyls, acrylonitrile, nitrites, sulfones, siloxanes, glycols, ethers, and combinations thereof.

13. The method of claim 12 where the first polymer component is a silicone-polycarbonate block copolymer.

14. The method of claim 13 where the first polymer component is a polydimethylsiloxane-poly(bisphenol A carbonate) block copolymer.

15. The method of claim 14 where the second polymer component is a polyacrylate or poly(methacrylate).

16. The method of claim 15 where the second polymer component is poly(methyl methacrylate).

17. The method of claim 12 where the thermoforming step comprises forming a blank in the shape of a contact lens from a sheet of the thermoformable gas permeable ocular lens composition and thermoforming the blank into a gas permeable ocular lens.

18. The method of claim 12, comprising:

comprising thermoforming into the lens a thermoformable gas permeable ocular lens composition comprising an interpenetrating polymer network containing about 70–98% by weight of the composition of the lens of a polydimethylsiloxane-poly(bisphenol A carbonate) block copolymer and from 30–2% by weight of the composition of the lens of poly(methyl methacrylate).

19. The method of claim 18 where the thermoforming step comprises forming a blank in the shape of a contact lens from a sheet of the thermoformable gas permeable ocular lens composition and thermoforming the blank into a gas permeable ocular lens.

* * * * *